US011173350B2

(12) United States Patent
Shindo

(10) Patent No.: US 11,173,350 B2
(45) Date of Patent: Nov. 16, 2021

(54) GOLF BALL

(71) Applicant: Bridgestone Sports Co., Ltd., Tokyo (JP)

(72) Inventor: Jun Shindo, Saitamaken (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 16/897,420

(22) Filed: Jun. 10, 2020

(65) Prior Publication Data

US 2020/0398116 A1 Dec. 24, 2020

(30) Foreign Application Priority Data

Jun. 24, 2019 (JP) .............................. JP2019-116333

(51) Int. Cl.
*A63B 37/06* (2006.01)
*A63B 37/00* (2006.01)

(52) U.S. Cl.
CPC ...... *A63B 37/0051* (2013.01); *A63B 37/0062* (2013.01); *A63B 37/0065* (2013.01); *A63B 37/0039* (2013.01); *A63B 37/0043* (2013.01); *A63B 37/0045* (2013.01); *A63B 37/0087* (2013.01); *A63B 37/0096* (2013.01)

(58) Field of Classification Search
CPC .......................... A63B 37/005; A63B 37/0063
USPC ........................................................ 473/357
See application file for complete search history.

(56) References Cited

U.S. PATENT DOCUMENTS

2006/0240911 A1* 10/2006 Higuchi .................... C08L 9/00
 473/371
2012/0165470 A1 6/2012 Ozawa et al.
2012/0165475 A1 6/2012 Ozawa et al.
2012/0165478 A1* 6/2012 Ozawa ............... A63B 37/0068
 525/370

FOREIGN PATENT DOCUMENTS

JP 2012-130679 A 7/2012
JP 2012-132004 A 7/2012
JP 2012-132005 A 7/2012

* cited by examiner

*Primary Examiner* — Raeann Gorden
(74) *Attorney, Agent, or Firm* — Sughrue Mion, PLLC

(57) ABSTRACT

In a golf ball having a core of one or more layer and a cover of one or more layer encasing the core, the core has a deflection when compressed under a specific load of at least 3.8 mm; at least an innermost portion of the core has a specific difference between maximum and minimum values in cross-sectional hardnesses (JIS-C) from a center to a surface thereof; and the center core is formed of a rubber composition that includes (a) a base rubber, (b) an $\alpha,\beta$-unsaturated carboxylic acid and/or metal salt thereof, (c) a diacyl peroxide and/or a peroxyester, and (d) a dialkyl peroxide and/or a peroxyketal. The golf ball has a low spin rate on driver shots by low head speed golfers, and thus achieves an improved distance, while minimizing any decrease in durability.

9 Claims, 1 Drawing Sheet

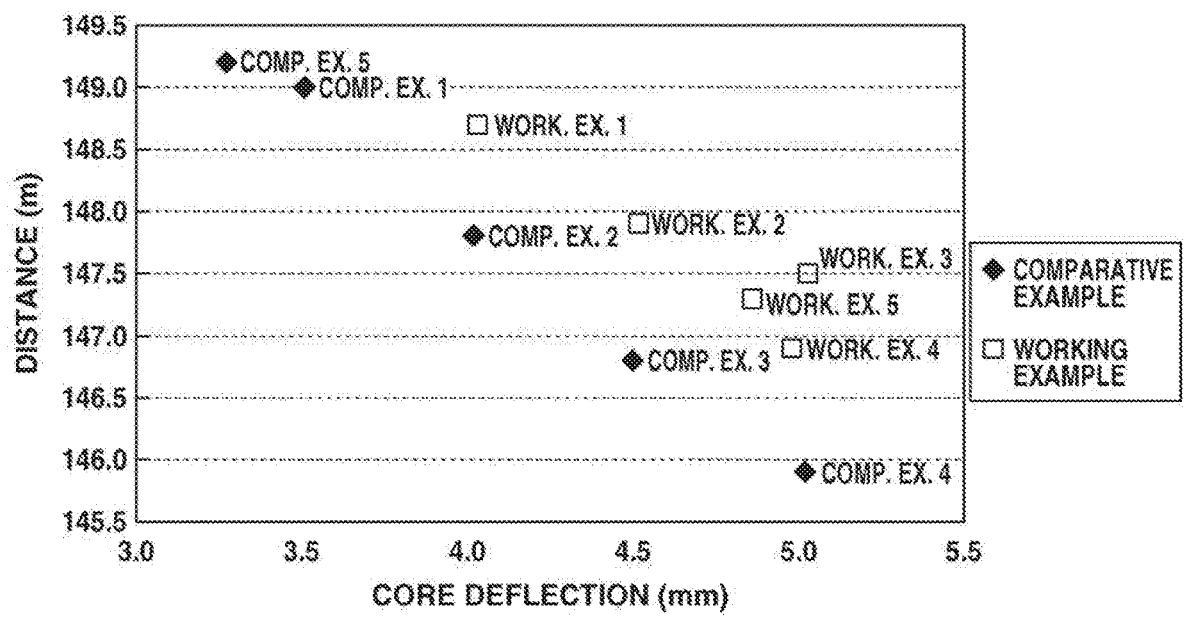

GOLF BALL

CROSS-REFERENCE TO RELATED APPLICATION

This non-provisional application claims priority under 35 U.S.C. § 119(a) on Patent Application No. 2019-116333 filed in Japan on Jun. 24, 2019, the entire contents of which are hereby incorporated by reference.

TECHNICAL FIELD

The present invention relates to a golf ball targeted at relatively low head speed golfers such as senior golfers, women golfers and junior golfers.

BACKGROUND ART

Some golfers, such as senior golfers and women golfers, have lower head speeds than professional golfers and skilled amateur golfers. By providing, for this reason, a golf ball structure in which the amount of deflection at the core interior has been set to a high value, that is, by finishing the ball to a soft structure, the ball can be made to incur a large deformation even when struck at a low head speed. As a result, when the ball is struck with a golf club, the impact is smaller, which is easier on the golfer, and the spin rate of the ball is held down, enabling a superior distance performance to be achieved.

Yet, when the overall ball is soft, the durability to impact is inferior or the launch velocity of the ball when struck decreases, resulting in a shorter distance. Hence, increasing the core deflection to at least a given value so as to make the core even softer has had the undesirable effect of leading to other problems.

The amount of deflection at the core interior and the hardness profile of the core interior structure are dependent on the crosslinked structure and crosslink density of the rubber in the core. Compounding ingredients and contents in the rubber composition are suitably selected with this in mind. The core is generally formed by vulcanizing a rubber composition which includes, for example, a base rubber such as polybutadiene, an unsaturated metal carboxylate such as zinc acrylate, and an organic peroxide. Prior art in which two or more organic peroxides having differing properties such as decomposition temperatures are used together is described in, for example, JP-A 2012-130679, JP-A 2012-132004 and JP-A 2012-132005.

However, although these three publications describe rubber compositions from which, owing to the selectivity of the organic peroxides included therein, molded and crosslinked rubbers of increased resilience and suitable hardness can be obtained, they do not provide details on the hardness at the interior of a core. Moreover, such rubbers are hard and have a low deflection. Hence, these prior-art disclosures were clearly not intended to provide golf balls for low head speed golfers.

SUMMARY OF THE INVENTION

It is therefore an object of the present invention to provide a golf ball which, while minimizing a decrease in durability, has an improved spin performance and is therefore capable of achieving an increased distance.

As a result of extensive investigations, I have discovered that by using, in a golf ball having a core of one or more layer and a cover of one or more layer encasing the core, a core that has a small change in hardness at the interior and a large deflection, wherein an innermost portion of the core, referred to herein as the "center core," is formed of a rubber composition containing (a) a base rubber, (b) an $\alpha,\beta$-unsaturated carboxylic acid and/or a metal salt thereof, (c) a diacyl peroxide and/or a peroxyester and (d) a dialkyl peroxide and/or a peroxyketal, the deflection of the core when compressed under a final load of 1,275 N (130 kgf) from an initial load of 98 N (10 kgf) is set to at least 3.8 mm, and the difference between maximum and minimum values in cross-sectional hardnesses from a center to a surface of the center core as measured by a specific method is adjusted to a JIS-C hardness value of 8 or less, there can be obtained a golf ball which has an increased distance due to improvement in the spin performance while minimizing any decrease in durability.

Accordingly, the invention provides a golf ball having a core of one or more layer and a cover of one or more layer encasing the core, wherein the core has a deflection when compressed under a final load of 1,275 N (130 kgf) from an initial load of 98 N (10 kgf) of at least 3.8 mm; at least an innermost "center core" portion of the core, has a difference between maximum and minimum values in cross-sectional hardness (JIS-C hardness) from a center to a surface thereof—as determined by measuring the JIS-C hardnesses at, in a smooth cross-section that passes through the center of the center core, a center point $N_1$, points $N_2$ to $N_9$ obtained by dividing any radius passing through the center equally by nine and a core surface point $N_{10}$, and selecting the largest value and the smallest value of the ten measurement points $N_1$ to $N_{10}$—of 8 or less; and the center core is formed of a rubber composition that includes (a) a base rubber, (b) an $\alpha,\beta$-unsaturated carboxylic acid and/or a metal salt thereof, (c) a diacyl peroxide and/or a peroxyester and (d) a dialkyl peroxide and/or a peroxyketal.

In a preferred embodiment of the golf ball of the invention, component (b) is included in an amount of 20 parts by weight or less per 100 parts by weight of the base rubber.

In another preferred embodiment of the inventive golf ball, component (c) is an aliphatic diacyl peroxide and/or an aliphatic peroxyester. The aliphatic diacyl peroxide is preferably dilauroyl peroxide. The aliphatic peroxyester is preferably tert-butyl peroxylaurate.

In yet another preferred embodiment, the content of component (c) relative to the combined amount of components (c) and (d) is at least 30 wt %.

In still another preferred embodiment, component (c) has a lower one-minute half-life temperature than component (d).

In another preferred embodiment, the rubber composition further includes (e) an organosulfur compound.

Advantageous Effects of the Invention

The golf ball of the invention has little change in hardness at the core interior, possesses a core deflection at or above a certain level, minimizes any decrease in durability, and achieves a low spin rate on shots by low head speed golfers with a driver (W #1), enabling an improved distance to be achieved.

BRIEF DESCRIPTION OF THE DIAGRAMS

FIG. 1 is a graph showing the relationship between core deflection and ball distance in the respective Examples and Comparative Examples.

DESCRIPTION OF THE PREFERRED EMBODIMENTS

The objects, features and advantages of the invention will become more apparent from the following detailed description taken in conjunction with the appended diagram.

The golf ball of the invention has a core of one or more layer and a cover of one or more layer encasing the core.

At least an innermost portion of the core, referred to herein as the "center core," is formed of a rubber composition that includes (a) a base rubber, (b) an α,β-unsaturated carboxylic acid and/or a metal salt thereof. (c) a diacyl peroxide and/or a peroxyester, and (d) a dialkyl peroxide and/or a peroxyketal.

It is preferable to use chiefly a polybutadiene as the base rubber serving as component (a). It is desirable for the polybutadiene to have a cis-1,4-bond content on the polymer chain of at least 60 wt %, preferably at least 80%, more preferably at least 90 wt %, and most preferably at least 95 wt %. At a cis-1,4-bond content among the bonds on the molecule which is too low, the resilience may decrease.

The polybutadiene has a content of 1,2-vinyl bonds on the polymer chain which is generally not more than 2 wt %, preferably not more than 1.7 wt %, and more preferably not more than 1.5 wt %. At a 1,2-vinyl bond content which is too high, the resilience may decrease.

The polybutadiene has a Mooney viscosity ($ML_{1+4}$ (100° C.)) of preferably at least 20, and more preferably at least 30. The upper limit is preferably not more than 100, more preferably not more than 80, and even more preferably not more than 65.

The term "Mooney viscosity" used herein refers to an industrial indicator of viscosity (JIS K 6300) measured with a Mooney viscometer, which is a type of rotary plastometer. This value is represented by the unit symbol $ML_{1+4}$ (100° C.), wherein "M" stands for Mooney viscosity, "L" stands for large rotor (L-type) and "1+4" stands for a pre-heating time of 1 minute and a rotor rotation time of 4 minutes. The "100° C." indicates that measurement was carried out at a temperature of 100° C.

The polybutadiene used may be one synthesized with a group VIII metal compound catalyst or a rare-earth catalyst.

The base rubber serving as component (a) may include, aside from the polybutadiene, another rubber ingredient such as styrene-butadiene rubber (SBR), natural rubber, polyisoprene rubber, ethylene-propylene-diene rubber (EPDM) or some other thermoplastic elastomer. These rubber ingredients, which can be mixed into the polybutadiene, may be of one type used alone or of two more types used in combination.

Component (b) is an α,β-unsaturated carboxylic acid and/or a metal salt thereof, and functions primarily as a co-crosslinking agent for the base rubber such as polybutadiene.

The number of carbon atoms on this unsaturated carboxylic acid is preferably from 3 to 8. Specific examples include unsaturated carboxylic acids such as acrylic acid, methacrylic acid, maleic acid and fumaric acid. Specific examples of the metal in the metal salts of these unsaturated carboxylic acids include zinc, sodium, magnesium, calcium and aluminum, with zinc being especially preferred. The co-crosslinking agent is most preferably zinc acrylate.

The content of component (b) per 100 parts by weight of the base rubber serving as component (a) is preferably not more than 20 parts by weight, more preferably not more than 18 parts by weight, and even more preferably not more than 16 parts by weight. The lower limit is preferably at least 8 parts by weight, more preferably at least 10 parts by weight, and even more preferably at least 12 parts by weight. At a content lower than this range, the core may be too soft and have a poor rebound, in addition to which the deformation of the ball when struck may be too large and the durability may be inferior. At a content higher than this range, the ball may be too hard and thus jarring to the hands when struck with a club, along with which the feel of the ball on shots may worsen.

Component (c) is a diacyl peroxide and/or a peroxyester. In particular, an aliphatic diacyl peroxide and/or an aliphatic peroxyester are preferred. The organic peroxide serving as component (c) is thought to actively contribute to polymerization of the unsaturated carboxylic acid monomer serving as component (b).

Specific examples of diacyl peroxides include dibenzoyl peroxide, di(3-methylbenzoyl) peroxide, benzoyl (3-methylbenzoyl) peroxide, disuccinic acid peroxide, dilauroyl peroxide, di(3,5,5-trimethylhexanol) peroxide and diisobutyl peroxide.

Specific examples of peroxyesters include 1,1,3,3-tetramethylbutyl peroxyneodecanoate, t-hexyl peroxyneodecanoate, t-butyl peroxyneodecanoate, t-butyl peroxyneoheptanoate, t-hexyl peroxypivalate, t-butyl peroxypivalate, 1,1,3,3-tetramethylbutyl peroxy-2-ethylhexanoate, 2,5-dimethyl-2,5-di(2-ethylhexanoylperoxy)hexane, t-hexylperoxy-2-ethylhexanoate, t-butylperoxy-2-ethylhexanoate, t-hexylperoxyisopropyl monocarbonate, t-butylperoxymaleic acid, t-butylperoxy-3,5,5-trimethylhexanoate, t-butylperoxylaurate, t-butylperoxyisopropyl monocarbonate, t-butylperoxy-2-ethylhexyl monocarbonate and t-butylperoxyacetate.

The above organic peroxide may be one selected from the above examples and used alone, or two or more may be used together. Commercial products may be used as these organic peroxides. Specific examples include Nyper® BW, Nyper® BMT, Peroyl® SA, Peroyl® L, Peroyl® 355, Peroyl® IB, Perocta® ND, Perocta® ND-50E, Perhexyl® ND, Perhexyl® ND-50E, Perbutyl® ND, Perbutyl® ND-50E, Perbutyl® NHP, Perhexyl® PV, Perhexyl® PV-50E, Perbutyl® PV, Perbutyl® PV-40E, Perocta® O, Perhexa® 25O, Perhexyl® O, Percure® HO(N), Perbutyl® O, Percure® O, Perhexyl® I, Perbutyl® MA, Perbutyl® 355, Perbutyl® Perbutyl® I-75, Perbutyl® E, Perbutyl® Z and Perbutyl® A (all from NOF Corporation); Luperox® P, Luperox® 26, Luperox® 11M75, Luperox® 10M75, Luperox® A98 and Luperox® LP (all from Arkema N.A.); and Trigonox® PM, Trigonox® 42 and Trigonox® 117 (all from Nouryon N.V.).

The content of component (c) per 100 parts by weight of the base rubber (a) is preferably at least 0.1 part by weight, and more preferably at least 0.5 part by weight. The upper limit is preferably not more than 10 parts by weight, more preferably not more than 8 parts by weight, and even more preferably not more than 5 parts by weight.

Component (d) is a dialkyl peroxide and/or a peroxyketal. The organic peroxide serving as component (d) is thought to actively contribute primarily to crosslinking reactions between polybutadiene rubber molecules and to grafting reactions of zinc acrylate onto polybutadiene rubber. Specific examples of dialkyl peroxides include 2,5-dimethyl-2,5-di(t-butylperoxy)-3-hexyne, di-t-butyl peroxide, t-butylcumyl peroxide, 2,5-dimethyl-2,5-di(t-butylperoxy)hexane, di-t-hexyl peroxide, dicumyl peroxide and di(2-t-butylperoxyisopropyl)benzene.

Specific examples of peroxyketals include 1,1-bis(t-butylperoxy)-3,3,5-trimethylcyclohexane, 1,1-di(t-hexylperoxy)-3,3,5-trimethylcyclohexane, 1,1-di(t-hexylperoxy)

cyclohexane, 2,2-di(t-butylperoxy)butane, 2,2-di(4,4-di-(t-butylperoxy)cyclohexyl)propane, n-butyl-4,4-di-(t-butylperoxy)valerate and 1,1-di(t-butylperoxy)cyclohexane.

The above organic peroxide may be one selected from the above examples and used alone, or two or more may be used together. Commercial products may be used as these organic peroxides. Specific examples include Percumyl® D, Perhexa® C-40, Perbutyl® P, Perbutyl® C, Perbutyl® D, Perhexa® 25B, Perhexyl® D, Perhexyne® 25B, Perhexa® TMH, Perhexa® HC, Pertetra® A and Perhexa® V (all from NOF Corporation): Luperox® DI, Luperox® 101, Luperox® DC, Luperox® F, Luperox® 231 and Luperox® 331 M80 (all from Arkema N.A.); and Trigonox® 29-40B (40% concentration product), Trigonox® 29, Trigonox® 17, Trigonox® 14, Trigonox® BC, Trigonox® B and Trigonox® T (all from Nouryon N.V.).

The content of component (d) per 100 parts by weight of the base rubber (a) is preferably at least 0.1 part by weight, and more preferably at least 0.3 part by weight. The upper limit is preferably not more than 5 parts by weight, more preferably not more than 3 parts by weight, and even more preferably not more than 2 parts by weight.

It is preferable for component (c) to have a one-minute half-life temperature which is lower than that of component (d). The reason is that, because the role played by component (c) and the role played by component (d) differ as mentioned above, by first having component (c) promote the polymerization reaction of component (b) and then effecting a crosslinking or grafting reaction by means of component (d), a core interior hardness that is flat and of a necessary and sufficient strength can be obtained, in addition to which it is possible to obtain a core having a high resilience. In cases where two or more types of component (c) and/or two or more types of component (d) are included, the lowest one-minute half-life temperature of component (c) is preferably lower than the highest one-minute half-life temperature of component (d).

To promote the polymerization of component (b) and obtain a relatively flat core interior hardness, the balance in which components (c) and (d) are included, expressed as the content of component (c) relative to the combined amount of components (c) and (d), is preferably at least 30%, more preferably at least 50 wt %, even more preferably at least 70 wt %, and most preferably at least 80 wt %.

Aside from above components (a) to (d), various additives such as fillers and antioxidants may be included, provided that doing so is not detrimental to the objects of the invention.

Examples of fillers that may be suitably used include zinc oxide, barium sulfate and calcium carbonate. One of these may be used alone, or two or more may be used together. The filler content per 100 parts by weight of the base rubber may be set to preferably at least 1 part by weight, more preferably at least 3 parts by weight, and even more preferably at least 5 parts by weight. The upper limit in the filler content per 100 parts by weight of the base rubber may be set to preferably not more than 100 parts by weight, more preferably not more than 60 parts by weight, and even more preferably not more than 40 parts by weight. At a filler content that is too high or too low, it may not be possible to obtain a proper weight and a suitable rebound.

Illustrative, non-limiting, examples of antioxidants include phenolic antioxidants such as 2,2-methylenebis(4-methyl-6-tert-butyl phenol), 4,4-butylidenebis(3-methyl-6-tert-butyl phenol) and 2,2-methylenebis(4-ethyl-6-tert-butyl phenol). Commercial products that may be used include Nocrac NS-6, NS-30 and NS-5 (from Ouchi Shinko Chemical Industry Co., Ltd.). One of these may be used alone, or two or more may be used together. The antioxidant content per 100 parts by weight of the base rubber, although not particularly limited, is preferably at least 0.05 part by weight, and more preferably at least 0.1 part by weight. The upper limit is preferably not more than 1.0 part by weight, more preferably not more than 0.7 part by weight, and even more preferably not or more than 0.4 part by weight. When too much or too little is included, a suitable core hardness gradient may not be obtained, as a result of which it may not be possible to obtain a rebound, a durability and a spin rate-lowering effect on full shots that are suitable.

A fatty acid or fatty acid metal salt may be included as another additive for the purpose of improving the processability and kneading dispersibility. Exemplary methods for incorporating this additive include charging the additive into a kneader together with the other ingredients, first mixing this additive together with the various ingredients and then charging the mixture into a kneader, and adding this additive during the process of producing the various ingredients. Also, among the above-mentioned commercial α,β-unsaturated carboxylic acids and/or metal salts thereof that may be used as component (b), there are known to exist grades which include a fatty acid or a metal salt thereof.

The above rubber composition may further include, as component (e), an organosulfur compound. Organosulfur compounds are exemplified by, without particular limitation, thiophenols, thionaphthaols, diphenylpolysulfides, halogenated thiophenols, and metal salts of these. Specific examples include the zinc salts of pentachlorothiophenol, pentafluorothiophenol, pentabromothiophenol and p-chlorothiophenol, and any of the following having 2 to 4 sulfur atoms: diphenylpolysulfides, dibenzylpolysulfides, dibenzoylpolysulfides, dibenzothiazoylpolysulfides and dithiobenzoylpolysulfides. These may be used singly, or two or more may be used together. Of these, preferred use can be made of the zinc salt of pentachlorothiophenol and/or diphenyldisulfide.

It is recommended that the amount of organosulfur compound included per 100 parts by weight of the base rubber be preferably at least 0.05 part by weight, more preferably at least 0.1 part by weight, and even more preferably at least 0.2 part by weight, and that the upper limit be preferably not more than 3 parts by weight, more preferably not more than 2 parts by weight, and even more preferably not more than 1 part by weight. Including too much organosulfur compound may result in a rubber vulcanizate that is too soft. On the other hand, including too little may result in an inadequate rebound-improving effect.

The structural components making up the core, such as the center core and an outer core layer, can be produced by vulcanizing/curing the rubber composition containing the above ingredients. Such a core component can be produced by using a mixing apparatus such as a Banbury mixer or a roll mill to knead the rubber composition, then using a core mold to compression mold or injection mold the kneaded composition and suitably heating the molded body at a temperature sufficient for the organic peroxide and co-crosslinking agent to act, such as between about 100° C. and about 200° C. for a period of 10 to 40 minutes, thereby curing the molded body. Vulcanization/molding can be separated into and carried out as two or more temperature stages, according to the temperatures at which the organic peroxides that are added react, or can be carried out without changing the temperature, i.e., at a constant temperature.

When the core is formed of two or more layers, the outer core layer that is formed outside of the above center core may be formed of the same type of rubber composition as the center core or may be formed of a different type of rubber composition. Also, the method used to form such an outer core layer on the surface of the center core may involve, for example, forming a pair of half cups from unvulcanized rubber in sheet form, placing the center core within these cups so as to encapsulate it, and then molding under applied heat and pressure. For example, preferred use can be made of a process wherein, following initial vulcanization (semi-vulcanization) to produce a pair of hemispherical cups, the prefabricated center core is placed in one of the hemispherical cups and then covered with the other hemispherical cup, in which state secondary vulcanization (complete vulcanization) is carried out. Alternatively, suitable use can be made of a process which divides vulcanization into two stages by rendering an unvulcanized rubber composition into sheet form so as to produce a pair of outer core layer-forming sheets, stamping the sheets using a die provided with a hemispherical protrusion to produce unvulcanized hemispherical cups, and subsequently covering a prefabricated center core with a pair of these hemispherical cups and forming the whole into a spherical shape by heating and compression at between 140° C. and 180° C. for a period of from 10 to 60 minutes.

Here, due to the above-described compounding of ingredients, the core molded under heating (when an outer core layer is formed over the center core, this refers to the overall core, including the center core and the outer core layer) has a deflection when compressed under a final load of 1,275 N (130 kgf) from an initial load of 98 N (10 kgf) of at least 3.8 mm, preferably at least 4.0 mm, and more preferably at least 4.5 mm. It is recommended that the upper limit be preferably not more than 6.5 mm, and more preferably not more than 5.5 mm. When the deflection is too large, the core becomes too soft, as a result of which a sufficient spin rate-lowering effect may not be obtained, in addition to which the rebound may decrease. On the other hand, when the deflection is too small, a spin rate-lowering effect may not be obtained and the feel of the ball on shots may become hard.

At least the innermost portion of the core, which portion is referred to herein as the "center core," has hardnesses at random positions from the center to the surface thereof such that the difference between the maximum and the minimum values, expressed in terms of JIS-C hardness, is not more than 8. That is, in this invention, by not setting the hardness difference between the surface and the center to a high value and designing the hardness profile at the interior of the center core from the center to the surface thereof so as to be relatively flat, a golf ball can be provided which, as a golf ball for low head-speed golfers, has a small impact when the golf club strikes the ball and thus is easier on the golfer, enables a lower spin rate to be achieved and does not have a decreased durability.

The difference between the maximum and minimum hardness values from the center to the surface of the center core—as determined by measuring the JIS-C hardnesses at, in a smooth cross-section that passes through the center of the core, a center point $N_1$, points $N_2$ to $N_9$ obtained by dividing equally by nine any radius passing through the center and a core surface point $N_{10}$, and selecting the largest value and the smallest value of the ten measurement points $N_1$ to $N_{10}$—is 8 or less, preferably 7 or less, and more preferably 5 or less.

The hardness gradient of the core used in this invention is preferably such that the hardness is either the same or increases from the center to the surface of the core, and does not decrease.

The core diameter is not particularly limited and depends also on the layer structure of the golf ball to be produced, but is preferably at least 30 mm, and more preferably at least 35 mm. The upper limit is preferably not more than 41 mm, and more preferably not more than 40 mm. At a core diameter outside of this range, the initial velocity of the ball may decrease or a suitable spin performance may not be obtained.

The golf ball of the invention has a construction that includes the above-described core and a cover of one layer or a plurality of layers. Next, the cover of one layer or a plurality of layers encasing the core is described.

The cover material is not particularly limited. Use can be made of one or more selected from the group consisting of the various types of ionomer resins that are used in golf balls and also thermoplastic elastomers such as urethane-based, amide-based, ester-based, olefin-based and styrene-based thermoplastic elastomers.

The ionomer resin is not particularly limited. Use can be made of known ionomer resins, including commercially available products such as those of the trade names H1706, H1605, H1557, H1601, AM7329, AM7317 and AM7318 available from Dow-Mitsui Polychemicals Co., Ltd.

To realize an even further spin rate-lowering effect in the ball, a highly neutralized ionomeric material may be used in the layer adjoining the core. Specifically, it is preferable to use a material obtained by blending components (i) to (iv) below:
100 parts by weight of a resin component composed of, in admixture,
(i) a base resin of (i-1) an olefin-unsaturated carboxylic acid random copolymer and/or a metal ion neutralization product of an olefin-unsaturated carboxylic acid random copolymer mixed with (i-2) an olefin-unsaturated carboxylic acid-unsaturated carboxylic acid ester random terpolymer and/or a metal ion neutralization product of an olefin-unsaturated carboxylic acid-unsaturated carboxylic acid ester random terpolymer in a weight ratio between 100:0 and 0:100, and
(ii) a non-ionomeric thermoplastic elastomer
in a weight ratio between 100:0 and 50:50:
(iii) from 5 to 80 parts by weight of a fatty acid and/or fatty acid derivative having a molecular weight of from 228 to 1,500; and
(iv) from 0.1 to 17 parts by weight of a basic inorganic metal compound capable of neutralizing un-neutralized acid groups in components (i) and (iii).
In particular, when using a mixed material of components (i) to (iv), it is preferable to utilize one in which at least 70% of the acid groups are neutralized.

To obtain the cover in this invention, use can be made of, for example, the method of placing a prefabricated core of one or more layer, depending on the type of ball, within a mold, heating, mixing and melting the above mixture and then injection-molding it over the core, thereby encasing the core periphery with the desired cover. Another cover-forming method that may be used involves forming a pair of hemispherical half-cups beforehand from the cover material of the invention, enveloping the core with these half-cups, and molding under applied pressure at between 120 and 170° C. for a period of 1 to 5 minutes.

When the cover is composed of one layer, the thickness thereof may be set to from 0.3 to 3 mm. When the cover is formed of two layers, the outer cover layer thickness may be set in the range of 0.3 to 2.0 mm and the inner cover layer thickness may be set in the range of 0.3 to 2.0 mm. The Shore D hardnesses of the respective layers making up the cover (cover layers), although not particularly limited, are set to preferably at least 40, and more preferably at least 45, but preferably not more than 70, and more preferably not more than 65.

Numerous dimples are formed on the surface of the outermost layer of the cover. In addition, the cover may be subjected to various types of treatment, such as surface preparation, stamping and painting. When such surface treatment is imparted to the cover formed of the above cover material, the good moldability of the cover surface enables the work to be carried out efficiently.

The present invention provides a golf ball in which the above rubber composition is used as the material for at least one layer of the core, i.e., the center core. As for the type of golf ball, this rubber composition may be used without particular limitation in golf balls having a core and one or more cover layer, including solid golf balls such as two-piece or three-piece solid golf balls in which the solid core is encased by the cover and multi-piece golf balls having at least a three-layer construction, and also wound golf balls in which a wound core is encased by a single-layer cover or a cover having a multilayer construction of two or more layers.

EXAMPLES

Examples and Comparative Examples are given below by way of illustration, although the invention is not limited by the following Examples.

Examples 1 to 5, Comparative Examples 1 to 5

Cores having a diameter of 37.3 mm, a weight of 32.7 g and a specific gravity of 1.201 are produced by using the rubber compositions composed primarily of polybutadiene shown in Table 1 below to prepare core compositions formulated for Examples 1 to 5 and Comparative Examples 1 to 5, and subsequently vulcanizing the compositions at 170° C. for 15 minutes.

Zinc acrylate: Available under the trade name "ZN-DA85S" (85% zinc acrylate/15% zinc stearate) from Nippon Shokubai Co., Ltd.
Organic Peroxide (1): Dicumyl peroxide (a dialkyl peroxide), available under the trade name "Percumyl D" from NOF Corporation; one minute half-life temperature, 175.2° C.
Organic Peroxide (2): n-Butyl-4,4-di-(t-butylperoxy)valerate (a peroxyketal), available under the trade name "Perhexa V" from NOF Corporation; one minute half-life temperature, 172.5° C.
Organic Peroxide (3): Dilauroyl peroxide (a diacyl peroxide), available under the trade name "Peroyl L" from NOF Corporation; one minute half-life temperature, 116.4° C.
Organic Peroxide (4): t-Butylperoxy laurate (a peroxyester), available under the trade name "Perbutyl L" from NOF Corporation; one minute half-life temperature, 159.4° C.

Cross-Sectional Hardness of Core

The cross-sectional hardnesses of the 37.3 mm diameter cores in each of the Examples and Comparative Examples are measured by the following method.

A planar cut is made in the core such that the resulting cross-section passes through the center of the core and, setting the indenter of a JIS-C durometer perpendicular to the planar cross-section, the durometer is used to measure the hardnesses at the center point $N_1$ of the hemispherical core, at points $N_2$ to $N_9$ obtained by dividing equally by nine the radius R (18.65 mm) from the center toward the surface of the core, and at a core surface point $N_{10}$. Of the ten resulting measurement points $N_1$ to $N_{10}$, the largest value and smallest value are selected, and the difference therebetween is entered in Table 3 as the "Hardness difference at interior."

Core Deflection

The deflection of the core in millimeters when compressed at a rate of 10 m's under a final load of 1,275 N (130 kgf) from an initial load of 98 N (10 kgf) is measured at a temperature of 23±1° C.

TABLE 1

| Rubber composition | | Comparative Example | | | | | Example | | | | |
|---|---|---|---|---|---|---|---|---|---|---|---|
| | (pbw) | 1 | 2 | 3 | 4 | 5 | 1 | 2 | 3 | 4 | 5 |
| (a) | Polybutadiene rubber | 100 | 100 | 100 | 100 | 100 | 100 | 100 | 100 | 100 | 100 |
| — | Antioxidant | 0.1 | 0.1 | 0.1 | 0.1 | 0.1 | 0.1 | 0.1 | 0.1 | 0.1 | 0.1 |
| — | Zinc oxide | | | | (amount needed to adjust specific gravity) | | | | | | |
| (b) | Zinc acrylate | 28.4 | 26.1 | 24.1 | 21.8 | 24.4 | 21.0 | 18.6 | 16.4 | 14.5 | 14.5 |
| | (real content) | (24.1) | (22.2) | (20.5) | (18.5) | (20.7) | (17.9) | (15.8) | (13.9) | (12.3) | (12.3) |
| (d) | Organic peroxide (1) | 0.5 | 0.5 | 0.5 | 0.5 | 0.5 | 0.5 | 0.5 | | 1 | 1 |
| (d) | Organic peroxide (2) | | | | | | | | 0.5 | | |
| (c) | Organic peroxide (3) | | | | | 4 | 2 | 4 | 2 | 0.5 | |
| (c) | Organic peroxide (4) | | | | | | | | | | 1 |
| | Content of (c) in (c) + (d) (wt %) | 0.0 | 0.0 | 0.0 | 0.0 | 88.9 | 80.0 | 88.9 | 80.0 | 33.3 | 50.0 |

Details on the above formulations are given below.
Polybutadiene rubber: Available under the trade name "BR 01" from JSR Corporation
Zinc oxide: Available as "Zinc Oxide Grade 3" from Sakai Chemical Co., Ltd.
Antioxidant: Available under the trade name "Nocrac NS-6" (a phenolic antioxidant from Ouchi Shinko Chemical Industry Co., Ltd.)

Formation of Cover (Intermediate Layer and Outermost Layer)

Using an injection mold, the intermediate layer material (ionomer resin material) shown in Table 2 is injection-molded over the core surface, thereby forming an intermediate layer having a thickness of 1.35 mm and a Shore D hardness of 54. Next, the outermost layer material (ionomer resin material) shown in Table 2 is injection-molded over the intermediate layer-encased sphere using another injection mold, thereby forming an outermost layer having a thickness of 1.35 mm and a Shore D hardness of 58 and giving a golf ball having a diameter of 42.7 mm and a weight of 45.3 g.

TABLE 2

| Blend (pbw) | Intermediate layer | Outermost layer |
|---|---|---|
| Himilan 1605 | 60 | |
| Surlyn 9320 | 40 | |
| Himilan 1601 | | 50 |
| Himilan 1557 | | 50 |

Details on the compounding ingredients in the table are given below.

TABLE 3

| | Measurement position | Distance from center | Comparative Example | | | | | Example | | | | |
|---|---|---|---|---|---|---|---|---|---|---|---|---|
| | | | 1 | 2 | 3 | 4 | 5 | 1 | 2 | 3 | 4 | 5 |
| Core hardness profile (JIS-C) | Center 1/10 | 0 mm | 55.8 | 53.9 | 52.2 | 50.7 | 67.9 | 63.1 | 64.7 | 61.6 | 59.8 | 62.1 |
| | 2/10 | 2.1 mm | 57.0 | 54.8 | 52.6 | 51.1 | 68.2 | 63.2 | 64.7 | 61.7 | 59.8 | 62.3 |
| | 3/10 | 4.1 mm | 58.3 | 55.8 | 53.1 | 51.1 | 68.3 | 63.4 | 64.8 | 61.8 | 59.8 | 62.3 |
| | 4/10 | 6.2 mm | 60.2 | 57.3 | 54.4 | 51.9 | 68.8 | 63.9 | 65.2 | 61.9 | 60.1 | 62.5 |
| | 5/10 | 8.3 mm | 62.9 | 59.8 | 55.6 | 53.4 | 69.5 | 65.0 | 65.4 | 62.2 | 60.6 | 62.8 |
| | 6/10 | 10.4 mm | 66.1 | 62.9 | 58.1 | 54.8 | 70.3 | 66.4 | 65.7 | 62.8 | 61.5 | 63.4 |
| | 7/10 | 12.4 mm | 69.0 | 66.1 | 61.4 | 57.6 | 71.6 | 67.7 | 66.1 | 63.7 | 62.5 | 64.1 |
| | 8/10 | 14.5 mm | 71.8 | 69.3 | 64.2 | 60.9 | 72.8 | 68.8 | 67.1 | 64.8 | 64.1 | 65.2 |
| | 9/10 | 16.6 mm | 73.8 | 71.5 | 67.8 | 64.9 | 73.5 | 70.0 | 68.0 | 65.9 | 65.6 | 66.4 |
| | Surface 10/10 | 18.7 mm | 74.7 | 72.4 | 70.2 | 68.1 | 74.0 | 70.8 | 68.6 | 66.5 | 66.6 | 67.1 |
| | Hardness difference at interior | | 18.9 | 18.5 | 18.0 | 17.4 | 6.1 | 7.7 | 3.9 | 4.9 | 6.8 | 5.0 |
| Core: Deflection under 10-130 kg loading (mm) | | | 3.5 | 4.0 | 4.5 | 5.0 | 3.3 | 4.0 | 4.5 | 5.0 | 5.0 | 4.9 |
| Ball: Deflection under 10-130 kg loading (mm) | | | 3.0 | 3.3 | 3.6 | 3.9 | 2.9 | 3.3 | 3.6 | 3.8 | 3.9 | 3.8 |
| Ball properties | Durability | | 0/10 | 0/10 | 3/10 | 10/10 | 0/10 | 0/10 | 0/10 | 0/10 | 0/10 | 0/10 |
| | Feel | | NG | fair | good | good | NG | fair | good | good | good | good |
| | Distance (m) | | 149.0 | 147.8 | 146.8 | 145.9 | 149.2 | 148.7 | 147.9 | 147.5 | 146.9 | 147.3 |
| | Spin rate (rpm) | | 3,302 | 3,203 | 3,115 | 3,017 | 3,340 | 3,181 | 3,079 | 2,975 | 2,995 | 3,004 |

Himilan 1605, Himilan 1601: Sodium-based ionomer resins available from Dow-Mitsui Polychemicals Co., Ltd.

Surlyn 9320, Himilan 1557: Zinc-based ionomer resins available from Dow-Mitsui Polychemicals Co., Ltd.

The resulting golf balls are measured and evaluated for deflection, durability to impact, feel, and spin performance and distance on shots with a driver. The results are shown in Table 3.

Ball Deflection

Aside from the ball serving as the object of measurement instead of the core, measurement is carried out under the same conditions as described above under "Core Deflection."

Durability of Ball to Impact

The durability of the golf ball is evaluated using an ADC Ball COR Durability Tester produced by Automated Design Corporation (U.S.). This tester fires a golf ball pneumatically and causes it to repeatedly strike two metal plates arranged in parallel. A single ball is fired 100 times at an incident velocity of 43 m/s, and then visually evaluate as to whether or not it cracked as a result. A total of ten balls are similarly evaluated, and the number that cracked is counted.

Feel of Ball

The feel of the ball when struck with a driver (W #1) is evaluated under the following criteria by ten low-head-speed amateur golfers having head speeds (HS) of 30 to 38 m/s.

Evaluation Criteria

Good: Eight or more of the golfers rated the feel as good

Fair: Five to seven of the golfers rated the feel as good

NG: None or up to four of the golfers rated the feel as good

Ball Flight (Spin Rate)

A driver (W #1) is mounted on a golf swing robot, and the spin rate of the ball immediately after being struck at a head speed (HS) of 35 m/s is measured using an apparatus for measuring the initial conditions. The distance traveled by the ball is also measured. The club used is the PHYZ Driver (loft angle, 10.5°) manufactured by Bridgestone Sports Co., Ltd.

As is apparent from Table 3, in Comparative Examples 1 and 5, the core deflection is too low, and so there remains some unpleasantness in the feel of the golf ball when played by low head speed golfers.

With regard to the distance in the Examples where the golf balls have the same deflections, when Comparative Example 2 is compared with Example 1, Comparative Example 3 is compared with Example 2, and Comparative Example 4 is compared with Examples 3, 4 and 5, as is evident from the graph shown in FIG. 1, the distances achieved in the Examples are longer than in the corresponding Comparative Examples. In other words, it is apparent that the golf balls in the Examples travel a longer distance when struck than did the golf balls in the Comparative Examples, yet have the same suitable feel at impact. It is also apparent that a sufficient durability is achieved in the Examples.

Also, when Comparative Example 2 is compared with Example 2 and Comparative Example 3 is compared with Examples 3, 4 and 5, as is apparent from the graph in FIG. 1, the golf balls in the Examples have a soft and suitable feel yet travel distances that are equal to or longer than those in the corresponding Comparative Examples.

Japanese Patent Application No. 2019-116333 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A golf ball comprising a core of one or more layer and a cover of one or more layer encasing the core, wherein the core has a deflection when compressed under a final load of 1,275 N (130 kgf) from an initial load of 98 N (10 kgf) of from 4.0 to 5.0 mm; at least an innermost "center core" portion of the core has a difference between maximum and minimum values in cross-sectional hardness (JIS-C hardness) from a center to a surface thereof—as determined by measuring the JIS-C hardnesses at, in a smooth cross-section that passes through the center of the center core, a center point $N_1$, points $N_2$ to $N_9$ obtained by dividing any radius passing through the center equally by nine and a core surface point $N_{10}$, and selecting the largest value and the smallest value of the ten measurement points $N_1$ to $N_{10}$—of 8 or less; and the center core is formed of a rubber composition comprising:
   (a) a base rubber,
   (b) an α,β-unsaturated carboxylic acid and/or a metal salt thereof,
   (c) a diacyl peroxide and/or a peroxyester, and
   (d) a dialkyl peroxide and/or a peroxyketal,
   and wherein component (b) is included in an amount of from 8 to 17.9 parts by weight per 100 parts by weight of the base rubber (a), and component (c) is tert-butyl peroxylaurate.

2. The golf ball of claim 1, wherein the content of component (c) relative to the combined amount of components (c) and (d) is at least 30 wt %.

3. The golf ball of claim 1, wherein component (c) has a lower one-minute half-life temperature than component (d).

4. The golf ball of claim 1, wherein the rubber composition further comprises (e) an organosulfur compound.

5. The golf ball of claim 1, wherein the base rubber is a polybutadiene synthesized with a group VIII metal compound catalyst.

6. The golf ball of claim 1, wherein the content of component (c) relative to the combined amount of components (c) and (d) is at least 80.0 wt %.

7. The golf ball of claim 1, wherein the content of component (d) per 100 parts by weight of the base rubber (a) is at least 0.5 parts by weight and not more than 5 parts by weight.

8. The golf ball of claim 1, wherein the content of component (c) per 100 parts by weight of the base rubber (a) is at least 2.0 parts by weight and not more than 10 parts by weight.

9. The golf ball of claim 1, wherein the cover is formed of two layers wherein the outer cover layer thickness is set in the range of from 0.3 to 2.0 mm and the inner cover layer thickness is set in the range of from 0.3 to 2.0 mm and the Shore D hardnesses of the respective layers making up the cover layers is set to from 40 to 70.

* * * * *